Patented May 1, 1951

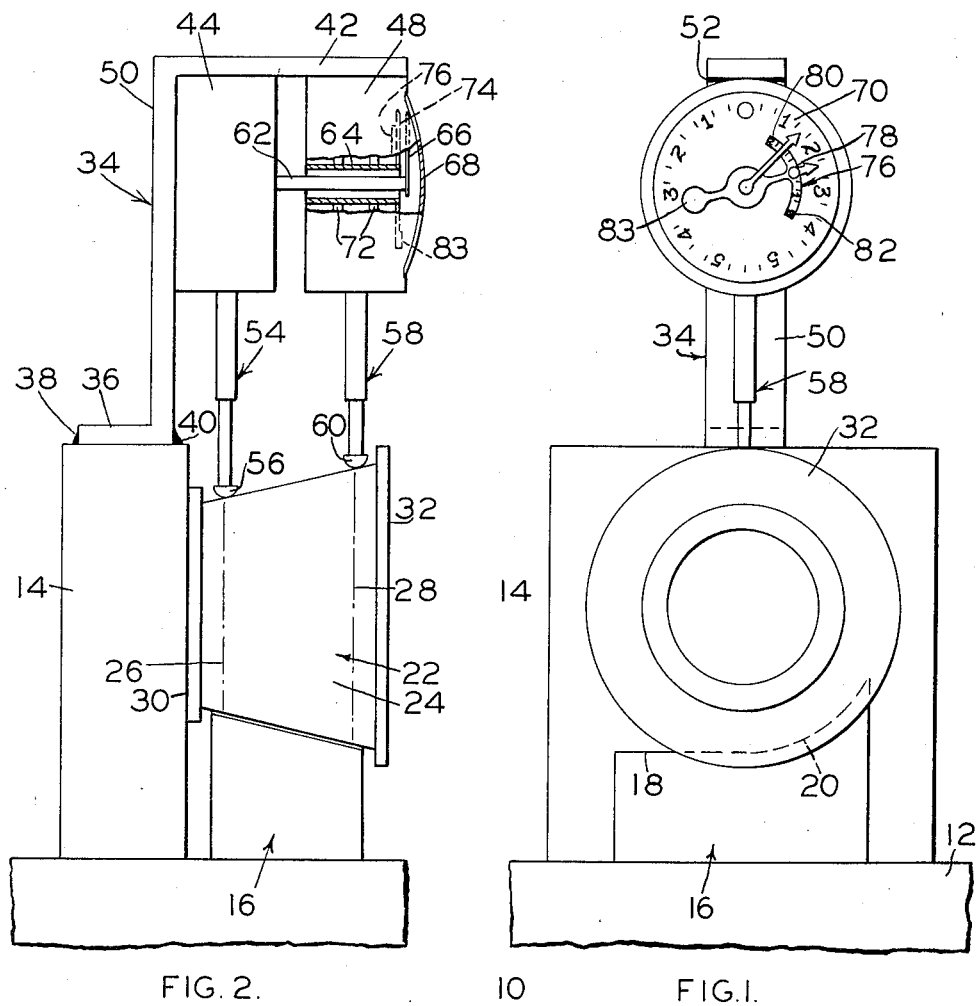

2,551,471

UNITED STATES PATENT OFFICE 2,551,471

TAPER BEARING RACE GAUGE

Kenneth T. Snow, Oak Park, Ill., assignor to International Harvester Company, a corporation of New Jersey Application July 15, 1949, Serial No. 104,919

4 Claims. (Cl. 33—174)

This invention relates to a new and improved taper bearing race gauge.

Present inspection or gauging of taper bearing races is extremely difficult. In the manufacture of bearing races it is desirable and very essential to have the bearing race made with minimum tolerances. The gauging of cylindrical races is relatively simple and requires but a single gauging device. With tapered bearing races, however, it is necessary to test the large diameter, the small diameter, and the degree of taper. At the present time, an inspector of taper bearings is required to take a first reading for one of the diameters, a second reading for the other diameter, and then calculate the degree of taper in order to determine the acceptability of the race.

It is therefore an important object of this invention to provide a gauging device which simultaneously provides direct scale readings of both the large and small diameters of the taper bearing race.

An important object of this invention is to provide a gauge for taper bearing races in which the large and small diameters are measured at the same time at one station to eliminate the necessity of the operator remembering the measurement of one diameter during the taking of the measurement of another diameter. This single station taper bearing race gauge is thus an improvement over the expired patent to Small 1,769,077 which has a common assignee with the applicant.

Another important object of this invention is to simultaneously gauge large and small diameters of a taper bearing race and have scale means indicating the degree of taper as well as the diameter measurements.

Another and still further important object of this invention is to provide a single station gauge for taper bearing races in which separate gauge elements are associated with the large and small diameter of the race and in which the indicating arms of each of these gauge elements is on a single calibrated dial so that an operator or inspector may determine at a single glance whether both diameters are within the range of the required tolerances.

A further important object of this invention is the provision of a gauge device in which the indicating finger thereof is superimposed on the dial of another gauge device.

Another and still further important object of this invention is to supply a gauging mechanism for taper elements in which the high and low readings of the taper element are simultaneously indicated on the single dial and further wherein scale means is movable with one of the indicating fingers whereupon in addition to directly indicating whether or not the large and small readings are within the accepted range of tolerances the degree of taper is also indicated showing that it is either within or without an accepted range of tolerance of the degree of taper.

Other and further important objects of this invention will become apparent from the disclosures in the following specification and accompanying drawing.

In the drawing:

Fig. 1 is a front elevational view of the taper bearing race gauge of this invention.

Fig. 2 is a side elevational view partially in section of the device as shown in Fig. 1.

As shown in the drawing, the reference numeral 10 indicates generally a supporting structure having a base 12 and a back 14. A nesting guide block 16 is mounted on the base 12 and is shaped in a manner to receive a tapered bearing race to be gauged for correct measurements. As best shown in Fig. 1, the block 16 is provided with a laterally extending top portion 18 and an upwardly curved portion 20 adapted to follow the outer contour of a tapered bearing race as shown at 22.

The bearing race 22 is provided with a conical tubular portion 24 having a relatively small diameter at 26 and a relatively large diameter at 28. The inner or small diameter side of the race 22 is provided with an outwardly extending annular flange 30 and is similar to an outwardly extending annular flange 32 adjacent the large diameter side 28. In making a test for bearing race size, the race 22 is slid into the nesting block 16 with the annular flange 30 against the back wall 14 of the supporting structure 10. It will be noted that the nesting block 16 is spaced from the back wall 14 and is of less thickness than the space between the flanges 30 and 32. The race 22 easily slides over the laterally extending portion 18 and when the conical portion 24 of the race strikes the curved portion 20 of the nesting block 16 the race is substantially fixed in position and measurements of the various parts thereof may readily be made without undesired movement of the race.

As best shown in Fig. 2, a superstructure 34 is attached by its foot member 36 to the upper side of the back wall 14. This attachment may be made by welding or any other suitable means such as shown at 38 and 40. The superstructure or additional framework 34 is also provided with an upper laterally bent portion 42 and is adapted to carry spaced gauge elements 44 and 48. The gauge member 44 is mounted against the back wall 50 of the structure 34 and beneath the top portion 42. The gauge 48 is suspended from the top 42 of the structure 34 and is in substantially axial alinement with the gauge 44. The attachment of the gauges to the structure 34 is preferably by welding such as shown at 52 but such attachment may be made by bolts or any other suitable means.

The gauge 44 is provided with a downwardly extending vertically reciprocable arm 54 which has a feeler pad 56 at the lower end thereof for riding on the upper surface of the small diameter 26 of the bearing race 22. Both the diameters 26 and 28 are indicated by dot-dash lines. The gauge 44 is so adjusted that it normally would register no movement of an indicating finger if the diameter 26 of the race 22 were the proper desired size between the nesting block 16 and the feeler 56. Similarly, the gauge element 48 has a downwardly extending vertically movable arm 58 having a feeler pad 60 adapted to ride on the large diameter 28 of the bearing race 22.

The gauge elements 44 and 48 employed in this device are standard instruments which are produced by a number of manufacturing companies and are constructed with a calibrated dial and an indicating finger movable over the dial to give direct readings of the position of the feelers 56 and 60. As a rule the amount of movement of the feeler must be multiplied in order to get a sufficient range or throw of the indicator dial finger in order to make the reading of the device relatively easy.

As shown in Fig. 2 the face of the rearwardly disposed gauge 44 is substantially concealed by the gauge 48 and thus cannot be and is not read in the usual manner. The gauge 44 is provided with a central shaft 62 extending outwardly from the center of the gauge. In normal gauges, the shaft 62 carries the dial indicating finger and terminates within a lens placed over the indicating dial. In the present instance the shaft 62 projects outwardly and is adapted to pass through the gauge 48 through a centrally disposed sleeve-like shaft 64 thereof. An indicating finger 66 is mounted at the forward end of the shaft 62 from the gauge 44 and is positioned within a transparent lens 68 covering the calibrated dial face 70 of the gauge 48. The shaft 64 is comparable to the shaft 62 and differs only in the fact that it has a centrally disposed passage to permit passage of and separate rotation of the shaft 62 therewithin. Suitable gear means 72 are shown in the broken away portion of the gauge 48 in order to magnify the movement of the feeler 60 to the dial indicating finger 74 of the gauge 48. The indicating fingers 66 and 74 are spaced along an axis taken through the two gauges to permit relative rotational movement thereof.

In operation, an inspector takes a taper bearing race 22 and slides it laterally across the back support 14 and onto and against the nesting block 16. The feelers 56 and 60 simultaneously impart notice of their position to their respective indicating fingers 66 and 74 shown on the single calibrated dial face 70. As an example, the tolerance for a tapered bearing race diameter might be plus or minus .0005 inch. Thus, if the pointers 66 and 74 are both within this tolerance range, then the diameters of the taper bearing race are acceptable. In most instances, however, the tolerance for the degree of taper is considerably less than the tolerance for the diameters, and although the diameters are acceptable, they might be so far apart as to cause the degree of taper to be beyond the scope of acceptability. For example, the degree of taper might be limited to plus or minus .0002 inch and thus the space between the pointers 66 and 74 must be limited to something less than a two-scale point difference. In the past the inspector must necessarily have taken the diameter readings separately and remembered what each one was and thereupon have made a mental calculation of the difference between the two readings and then determine whether or not the degree of taper is within an acceptable range.

In order to eliminate the necessity of mental calculations, applicant has provided an arcuate scale 76 fixedly mounted on and forming a part of the pointer 74. The arcuate scale 76 is concentric with the calibrated dial scale 70 and has units equal in spacing to the unit spacing on the dial 70. The center of the scale 76 at the point where it attaches to and corresponds with the pointer 74 is designated by the numeral 0 as shown at 78. One portion of the scale 80 extends to one side of the pointer 74 and a second portion 82 extends to the other side of the pointer 74. Each portion of the scale is provided with consecutive numbers inscribed thereon upwardly from the 0 center. The weight of the scale 76 is thus symmetrically apportioned about the finger-like pointer 74 and provides for ready and easy reading of the spacing of the pointer 66 away from the pointer 74 regardless of the direction of the spacing between the two pointers. Weight means 83 are employed on the shaft 64 diametrically opposite the scale 76 so that the scale will be balanced. In the illustration shown in Fig. 1 of the drawing, the pointer 66 is shown at the minus 1 reading on the portion 80 of the scale 76. It will thus be realized upon examination of the gauge device that both diameters 26 and 28 are well within the plus or minus .0005 inch tolerance range and also that the degree of taper is well within the plus or mius .0002 inch range of tolerance. The distance between the two scale pointers 66 and 74 is readable upon a single glance on the scale 76 for the reason that the scale is numbered 0 at the point of crossing of the pointer 74 and thus no mental calculations are necessary to indicate the amount of spacing between the pointers inasmuch as wherever the pointer 66 lies on the arcuate scale 76 it is just that distance indicated by the scale away from the pointer 74.

It is believed that herein is provided a novel gauging device for taper bearing races or any other tapered elements wherein it is necessary to measure both large and small diameters and/or the degree of taper between the large and small diameters. The device eliminates all mental calculations and use of memory by the inspector employing the gauge and provides all of the necessary readings within a single dial. The speed of testing bearing races manufactured will thus be considerably increased by reason of the simultaneous reading of both large and small diameters and the degree of taper of the tapered race.

I am aware that certain details of construction may be varied throughout a wide range without departing from the principles disclosed herein and I therefore do not propose limiting the patent granted hereon otherwise than as necessitated by the appended claims.

What is claimed is:

1. A gauging mechanism for tapered elements comprising a supporting structure, first and second alined gauging elements, a receiving station for tapered elements, each of said gauge elements having a feeler engaging the tapered element at spaced locations, a shaft in the first of said gauge elements rotatable in response to movement of its feeler, a sleeve shaft within the second gauge element rotatable in response to movement of its feeler, the first of said shafts passing through the sleeve shaft, pointer fingers mounted on each of said shafts, a calibrated dial mounted on and forming a part of the second gauge element, said pointer fingers adapted to be separately rotated over said calibrated dial whereby separate readings may be simultaneously had of the size of the tapered element at the spaced locations and scale means attached to one of said finger pointers whereby the degree of taper of the tapered element may be simultaneously read on said scale means along with the tapered element sizes in the spaced locations.

2. A gauge for conical shaped objects comprising a supporting structure, a nesting block mounted on said supporting structure and adapted to receive said conical objects, first and second gauge elements carried by said supporting structure in a position diametrically opposed from said nesting block, each of said first and second gauge elements having respective feeler members adapted to engage the conical objects at spaced points thereof for determining the variations in the diameters of the conical objects at these spaced locations, the first of said gauge elements having a shaft extending outwardly therefrom and rotatable in response to movement of its feeler, the second of said gauge elements having a tubular sleeve rotatable gauge, said first shaft telescoping through the sleeve shaft, a calibrated indicating dial mounted on said second gauge element, and pointer fingers mounted on each of said shafts and operable individually over the dial on the second gauge, one of said finger pointers provided with an arcuate scale concentric with the calibrated scale on the indicating dial whereby the diameters of the conical objects at the spaced locations of the feelers may be simultaneously viewed on the calibrated dial and the degree of taper between the two diameters of the conical objects may be simultaneously viewed on the arcuate concentric scale carried on one of said finger pointers.

3. A device as set forth in claim 2 in which the arcuate scale is provided with portions extending to both sides of the carrying finger pointer and the arcuate scale is inscribed with a zero at the point of crossing the carrying finger pointer and inscribed with consecutive numbers upwardly on both oppositely extending portions of said scale corresponding to the calibrations of the calibrated dial of the second gauge element.

4. A device as set forth in claim 3 in which the counterbalancing weight is provided on the tubular shaft diametrically opposite the finger pointer and scale it carries.

KENNETH T. SNOW.

REFERENCES CITED

The following references are of record in the file of this patent:

UNITED STATES PATENTS

| Number | Name | Date |
| --- | --- | --- |
| 711,521 | Parmelee | Oct. 21, 1902 |
| 764,759 | Owen | July 12, 1904 |
| 1,643,570 | Bartholdy | Sept. 27, 1927 |
| 2,016,420 | Engst | Oct. 8, 1935 |
| 2,103,688 | Milntin | Dec. 28, 1937 |
| 2,124,960 | Waring | July 26, 1938 |
| 2,427,152 | Moore | Sept. 9, 1947 |

FOREIGN PATENTS

| Number | Country | Date |
| --- | --- | --- |
| 235,507 | England | June 18, 1925 |